United States Patent
Mangin

(10) Patent No.: US 9,838,334 B2
(45) Date of Patent: Dec. 5, 2017

(54) METHOD FOR ALLOCATING RESOURCES IN A MESH COMMUNICATIONS NETWORK, COMPUTER PROGRAM, INFORMATION STORAGE MEANS AND NODE DEVICE

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 122 days.

(21) Appl. No.: 14/763,432

(22) PCT Filed: Feb. 19, 2014

(86) PCT No.: PCT/JP2014/054592
§ 371 (c)(1),
(2) Date: Jul. 24, 2015

(87) PCT Pub. No.: WO2014/156438
PCT Pub. Date: Oct. 2, 2014

(65) Prior Publication Data
US 2016/0014044 A1    Jan. 14, 2016

(30) Foreign Application Priority Data
Mar. 29, 2013 (EP) ..................... 13161839

(51) Int. Cl.
*H04L 12/911* (2013.01)
*H04L 12/913* (2013.01)
(Continued)

(52) U.S. Cl.
CPC ............ *H04L 47/821* (2013.01); *H04L 45/12* (2013.01); *H04L 45/745* (2013.01); *H04L 47/724* (2013.01); *H04L 49/351* (2013.01)

(58) Field of Classification Search
None
See application file for complete search history.

(56) References Cited

U.S. PATENT DOCUMENTS

| | | | |
|---|---|---|---|
| 6,324,162 B1 * | 11/2001 | Chaudhuri | ............. H04B 1/745 340/2.9 |
| 2002/0059432 A1 | 5/2002 | Masuda et al. | |

(Continued)

OTHER PUBLICATIONS

Braden et al., "Version 1 Functional Specification; RFC2205.txt", XP015007989, ISSN: 0000-0003, Sep. 1, 1997, See Sections 1.2, 1.3 and 2.5.

*Primary Examiner* — Edan Orgad
*Assistant Examiner* — Saumit Shah
(74) *Attorney, Agent, or Firm* — Birch, Stewart, Kolasch & Birch, LLP

(57) ABSTRACT

For allocating resources in a mesh communications network for setting up a data stream transmission from a talker device to a listener device via at least one node device, data paths being defined throughout the mesh communications network following a link-state routing protocol, each node device performs receiving, obtaining, determining, and checking. And when there are enough said resources, temporarily reserving and propagating. And when receiving for said data stream transmission a stream reservation response representative of a positive acknowledgement to said stream reservation request, effectively allocating and propagating.

12 Claims, 6 Drawing Sheets

Figure 3:
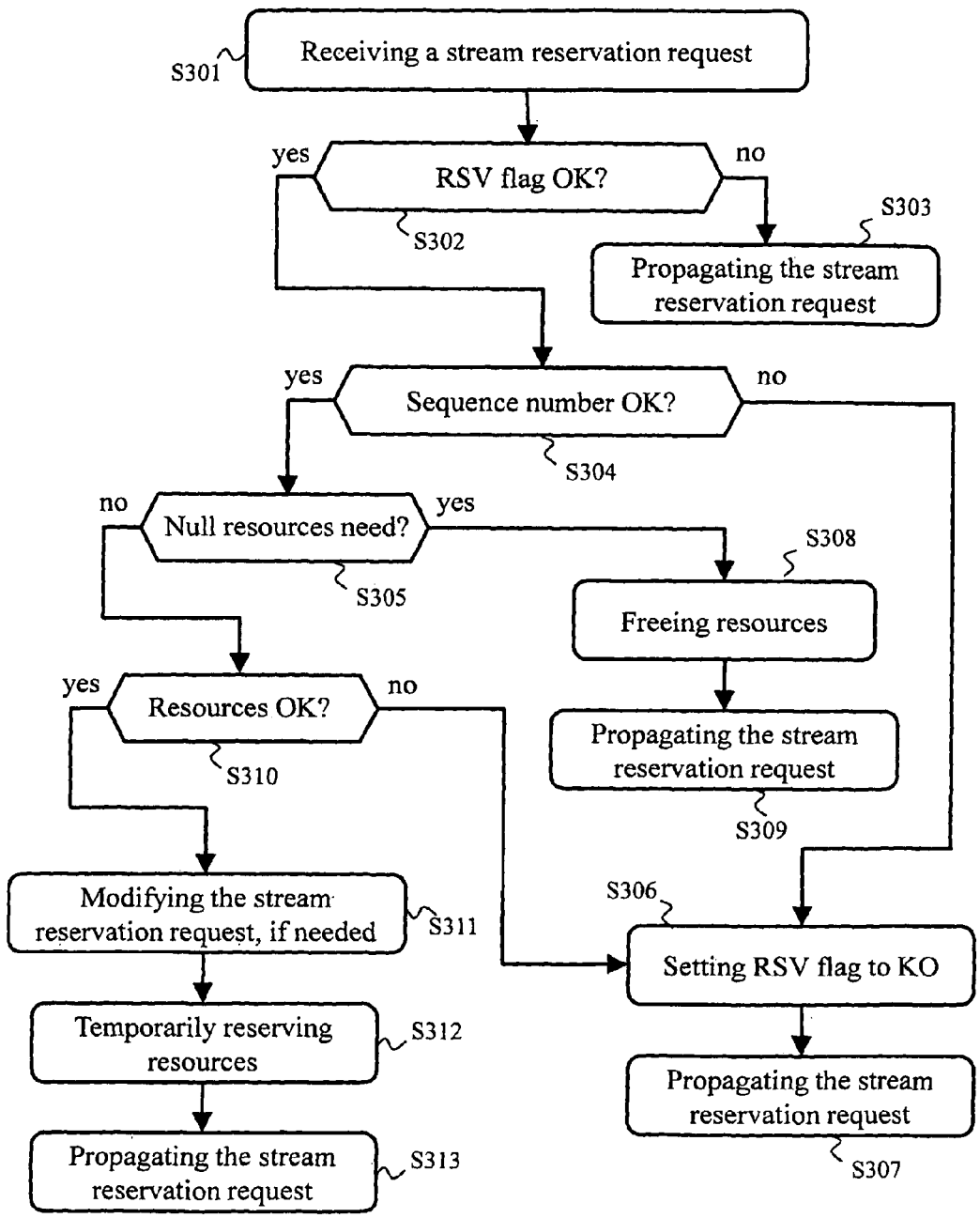

(51) Int. Cl.
  *H04L 12/721* (2013.01)
  *H04L 12/741* (2013.01)
  *H04L 12/931* (2013.01)

(56) References Cited

U.S. PATENT DOCUMENTS

2008/0259895 A1* 10/2008 Habetha ................ H04W 74/04
                                                                  370/345
2012/0314597 A1* 12/2012 Singh .................. H04L 43/0882
                                                                  370/252
2013/0279323 A1* 10/2013 Allan ..................... H04L 45/28
                                                                  370/225

* cited by examiner

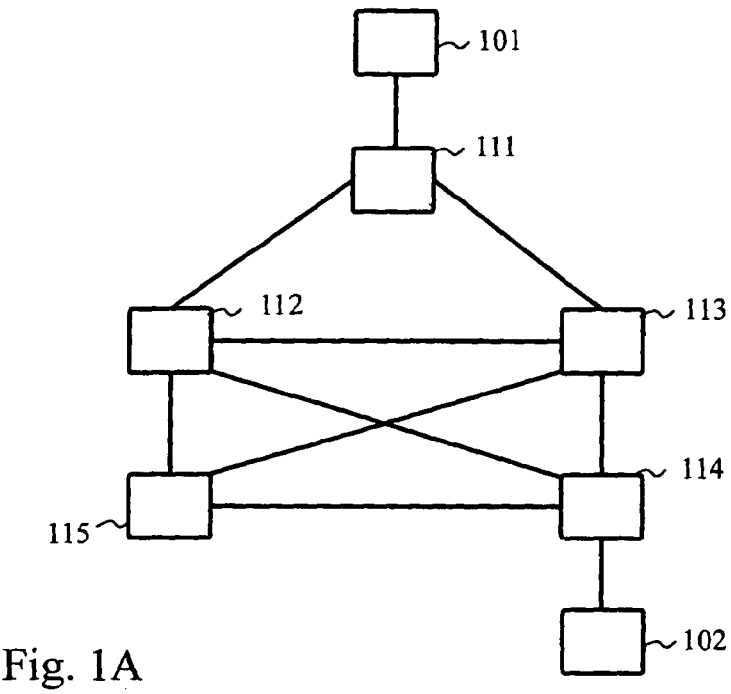
Fig. 1A
| 151 | 152 | 153 | 154 |
|---|---|---|---|
| EP @ | EP Port | Path ID | Res |
| ... | ... | ... | ... |
| ... | ... | ... | ... |
Fig. 1B
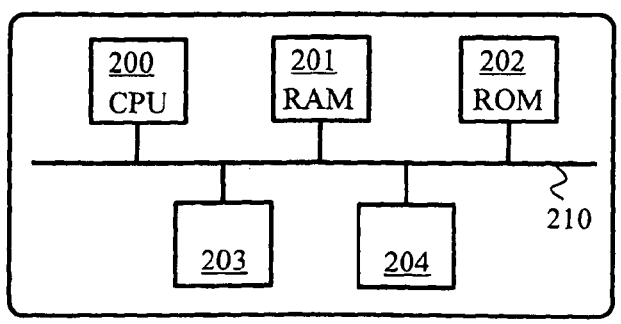
Fig. 2

METHOD FOR ALLOCATING RESOURCES IN A MESH COMMUNICATIONS NETWORK, COMPUTER PROGRAM, INFORMATION STORAGE MEANS AND NODE DEVICE

The present invention generally relates to allocating resources in a mesh communications network for setting up a data stream transmission.

In order to enable setting up communications in a mesh communications network, the node devices implement a link-state routing protocol, which leads to each node device building a forwarding table. The forwarding tables contain information for allowing the node devices to determine, when receiving a message or a data packet including information about the addressee, to which output port of the node device the message or data packet has to be forwarded. The forwarding table is sometimes referred to as filtering table.

Link-state routing protocols are widely used in communications network, in order to automatically propagate and synchronize network topology information in the mesh communications network. One can for instance cite the link-state routing protocol SPB (Short Path Bridging), as detailed in the standard IEEE 802.1aq. SPB enables implementing logical Ethernet networks on top of native Ethernet infrastructures using a link-state type of routing protocol in order to advertise both topology and logical network membership. Other link-state routing protocols exist to achieve the same goals as SPB.

In order to perform resources allocation for data stream transmissions, signaling for admission control needs to be implemented in the mesh communications network. SRP (Stream Reservation Protocol, as defined in the standard IEEE 802.1Qat), which operates at layer-2 of the OSI (Open Systems Interconnection) model, can be used for that purpose. Listener devices use primitives to indicate what data streams are to be received, whereas talker devices use primitives to announce the streams that can be supplied. From these primitives, the resources are allocated and configured in the talker device, in the listener device, as well as in transit nodes along the data path of the data stream. An end-to-end signaling mechanism to detect success or failure of the allocation is also provided. However, this approach relies on many messages exchanges in the mesh communications network. Moreover, in the context of a mesh communications network, such an approach lacks of flexibility, as it would not allow easily switching from one data path to another to transmit the data stream from the talker device to the listener device.

It is desirable to overcome the aforementioned problems of the state of the art.

In particular, it is desirable to provide a solution that reduces the amount of messages and/or data exchanged for setting up the data stream and that simplifies the propagation of said messages and/or data.

It is furthermore desirable to provide a solution that is easy-to-implement and that is cost-effective.

To that end, the present invention concerns a method for allocating resources in a mesh communications network for setting up a data stream transmission from a talker device to a listener device via at least one node device, data paths being defined throughout the mesh communications network following a link-state routing protocol. The method is such that each node device performs: receiving a stream reservation request for said data stream transmission; obtaining, from said stream reservation request, a path identifier identifying a data path via which said data stream transmission has to be set up, and an identifier of said listener device; determining via which output port of said node device the data path identified in the stream reservation request continues toward the listener device; checking whether there are enough resources, associated with the determined output port, to fulfill resources requirements of the received stream reservation request. And when there are enough said resources, said node device performs: temporarily reserving resources for said data stream transmission; and propagating the stream reservation request toward the listener device. And when receiving for said data stream transmission a stream reservation response representative of a positive acknowledgement to said stream reservation request, said node device performs: effectively allocating at least part of the reserved resources; and propagating the stream reservation response toward the talker device.

Thus, the amount of messages exchanged in the mesh communications network is reduced compared to state-of-the-art approaches, and the propagation of said messages is simplified.

According to a particular feature, the listener device performs: receiving the stream reservation request; checking whether there are enough internal resources to fulfill resources requirements of the received stream reservation request; transmitting toward the talker device the stream reservation response representative of a positive acknowledgement to said stream reservation request, when there are enough said internal resources; and, transmitting toward the talker device a stream reservation response representative of a negative acknowledgement to said stream reservation request, when there is not enough said internal resources.

Thus, the listener device is able to ensure QoS (Quality of Service) when said listener device receives a plurality of data streams.

According to a particular feature, when there is not enough said resources, said node device performs: modifying the stream reservation request by indicating a resource reservation problem; and, propagating the modified stream reservation request.

Thus, the indication of resource reservation problem is propagated downstream.

According to a particular feature, when receiving the stream reservation request, the listener device performs beforehand: checking whether the received stream reservation request indicates a resource reservation problem that occurred upstream; and, transmitting toward the talker device a stream reservation response representative of a negative acknowledgement to said stream reservation request, when the stream reservation request indicates the resource reservation problem.

Thus, the indication of resource reservation problem is propagated upstream from the listener device to the talker device.

According to a particular feature, when transmitting a stream reservation request, the talker device starts a first timer with a first predefined timeout, and when the first timer times out without the talker device having received the stream reservation response representative of a positive acknowledgement to said stream reservation request, the talker device instructs said node device to free said reserved resources.

Thus, the talker device is able to manage the resources of the mesh communications network, even though communication issues occur during the transmission of the stream reservation request or the stream reservation response throughout the mesh communications network.

According to a particular feature, when receiving for said data stream transmission a stream reservation response representative of a negative acknowledgement to said stream reservation request, said node device performs: freeing said reserved resources; and, propagating toward the talker device said stream reservation response.

Thus, the node device is able to take into account an inability of another node device or of the listener device to handle the data stream according to the requirements of the stream reservation request.

According to a particular feature, said node device frees reserved or allocated resources for said data stream, when receiving a stream reservation request with a null indication of resources need.

Thus, tearing down a data stream is easily implemented.

According to a particular feature, when temporarily reserving resources for said data stream, said node device starts a second timer with a second predefined timeout, and when the second timer times out without said node device having received the stream reservation response representative of a positive acknowledgement to said stream reservation request, said node device frees said reserved resources.

Thus, the node device is able to manage the resources associated to the concerned output port of said node device, even though communication issues occur during the transmission of the stream reservation request or the stream reservation response throughout the mesh communications network.

According to a particular feature, the stream reservation request contains, in addition to the indication of resources requirements for the data stream, an indication of a resources limit beyond which the data stream has not to be accepted. Furthermore, the node device modifies the indication of resources requirements in the stream reservation request to show the effective capability of said node device for said data stream, when said effective capability is between said resources requirements and said resources limit; and, when the node device receives the stream reservation response representative of a positive acknowledgement to said stream reservation request, said node device effectively allocates only the amount of resources represented by the indication of resources requirements included in the stream reservation response.

Thus, flexibility is brought in the data stream setup.

According to a particular feature, the talker device transmits plural stream reservation requests for said data stream via plural respective distinct data paths. Furthermore, when the listener device receives said plural stream reservation requests, the listener device performs: selecting at least one data path for which the stream reservation request shows the best performances among said plural stream reservation requests, according to the indications of resources requirements included in the respective stream reservation requests; transmitting a stream reservation response representative of a positive acknowledgement to the stream reservation request(s) concerning the selected data path(s); and transmitting a stream reservation response representative of a negative acknowledgement to each stream reservation request concerning another data path than the selected data path(s).

Thus, good performances data stream setups can be achieved with a reduced processing latency.

According to a particular feature, said data paths resulting from the link-state protocol are described in forwarding tables each consisting of a correspondence between: a data path identifier; an identifier of an end-point of said data path; and an identifier of an output port of the node device implementing said forwarding table, via which the identified end-point of said data path is reachable. And, after building the forwarding table, the node device enhances said forwarding table with an indication of available resources associated with the identified output port.

Thus, fast allocation of resources along pre-established paths is enabled.

According to a particular feature, the mesh communications network is of Ethernet type and in that the link-state routing protocol is the Shortest Path Bridging SPB protocol.

The present invention also concerns a node device intended to be included in a mesh communications network for setting up a data stream transmission from a talker device to a listener device, data paths being defined throughout the mesh communications network following a link-state routing protocol. The node device implements: means for receiving a stream reservation request for said data stream transmission; means for obtaining, from said stream reservation request, a path identifier identifying a data path via which said data stream transmission has to be set up, and an identifier of said listener device; means for determining via which output port of said node device the data path identified in the stream reservation request continues toward the listener device; means for checking whether there are enough resources, associated with the determined output port, to fulfill resources requirements of the received stream reservation request. And when there are enough said resources, said node device further implements: means for temporarily reserving resources for said data stream transmission; and, means for propagating the stream reservation request toward the listener device. And when receiving for said data stream transmission a stream reservation response representative of a positive acknowledgement to said stream reservation request, said node device further implements: means for effectively allocating at least part of the reserved resources; and, means for propagating the stream reservation response toward the talker device.

The present invention also concerns a computer program that can be downloaded from a communication network and/or stored on a medium that can be read by a computer and run by a processor. This computer program comprises instructions for implementing the aforementioned method in any one of its embodiments, when said program is run by the processor. The present invention also concerns information storage means, storing such a computer program.

Since the features and advantages related to the system and to the computer program are identical to those already mentioned with regard to the corresponding aforementioned method, they are not repeated here.

Figure 4:
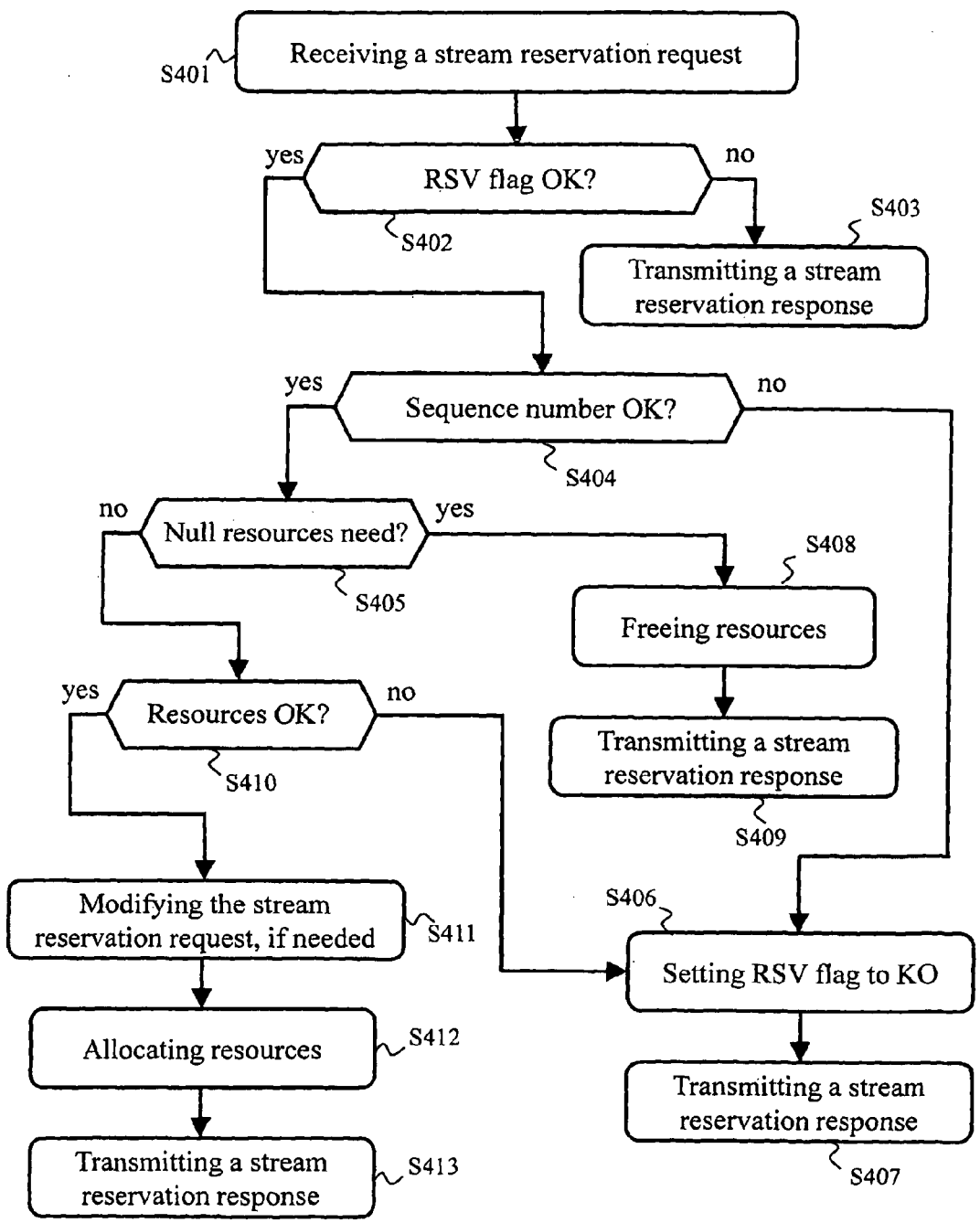
Figure 5:
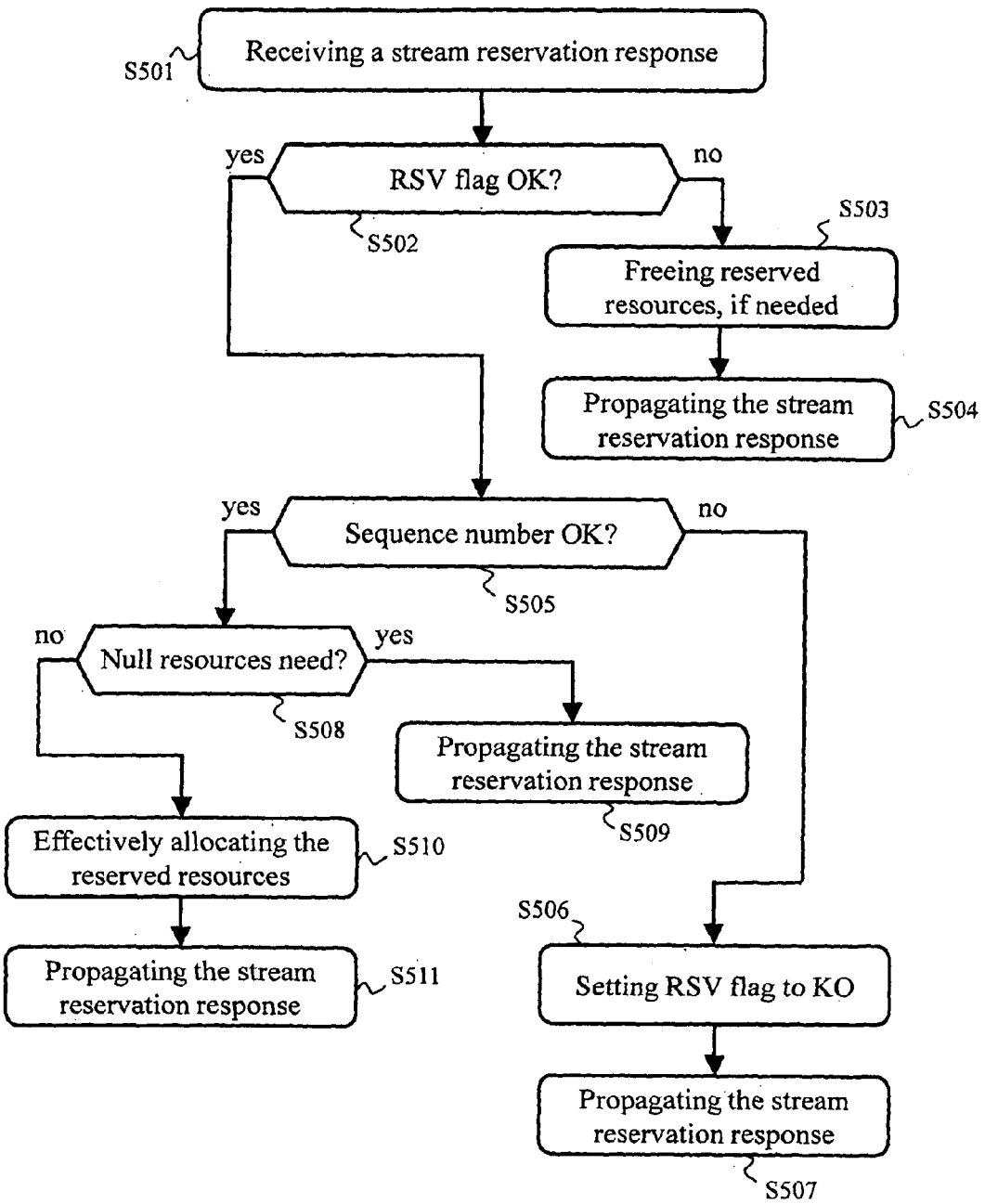
Figure 6:
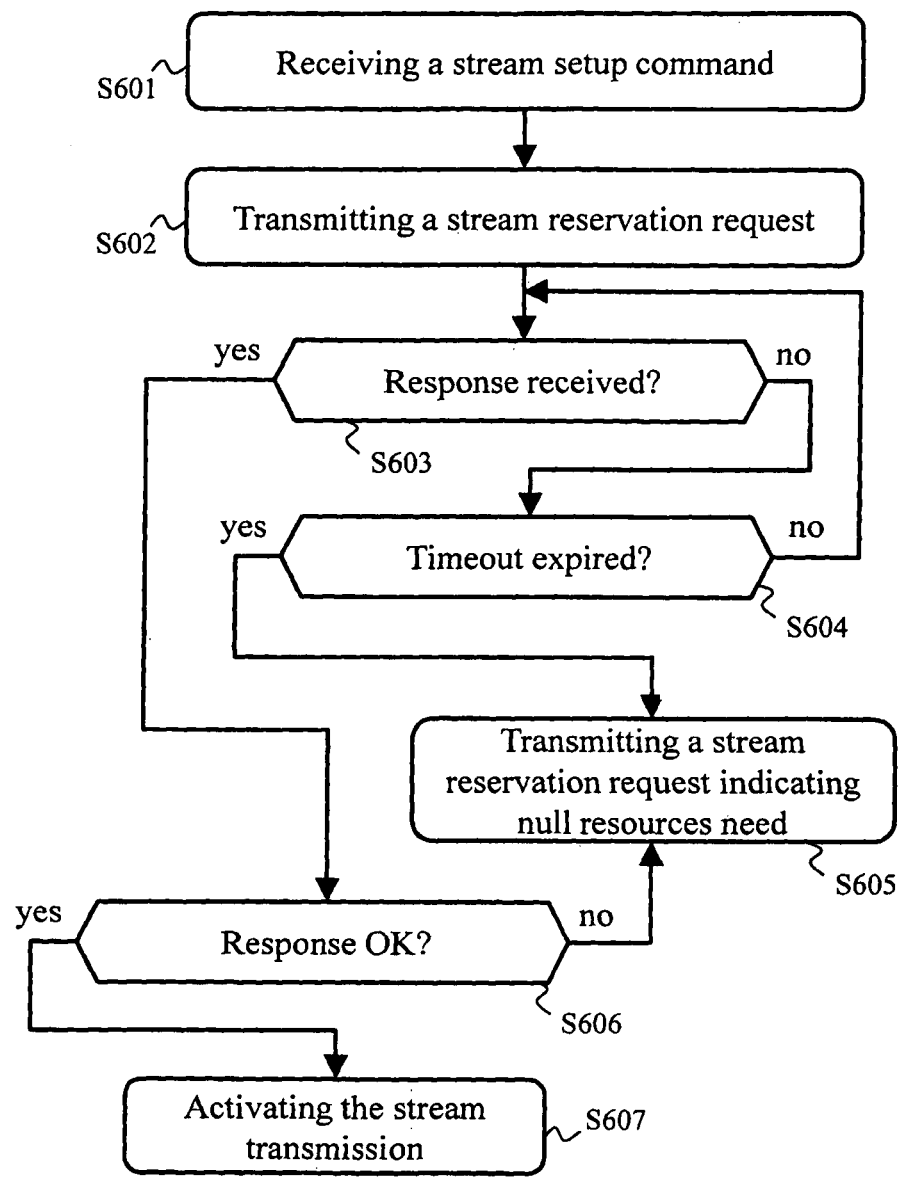
Figure 7:
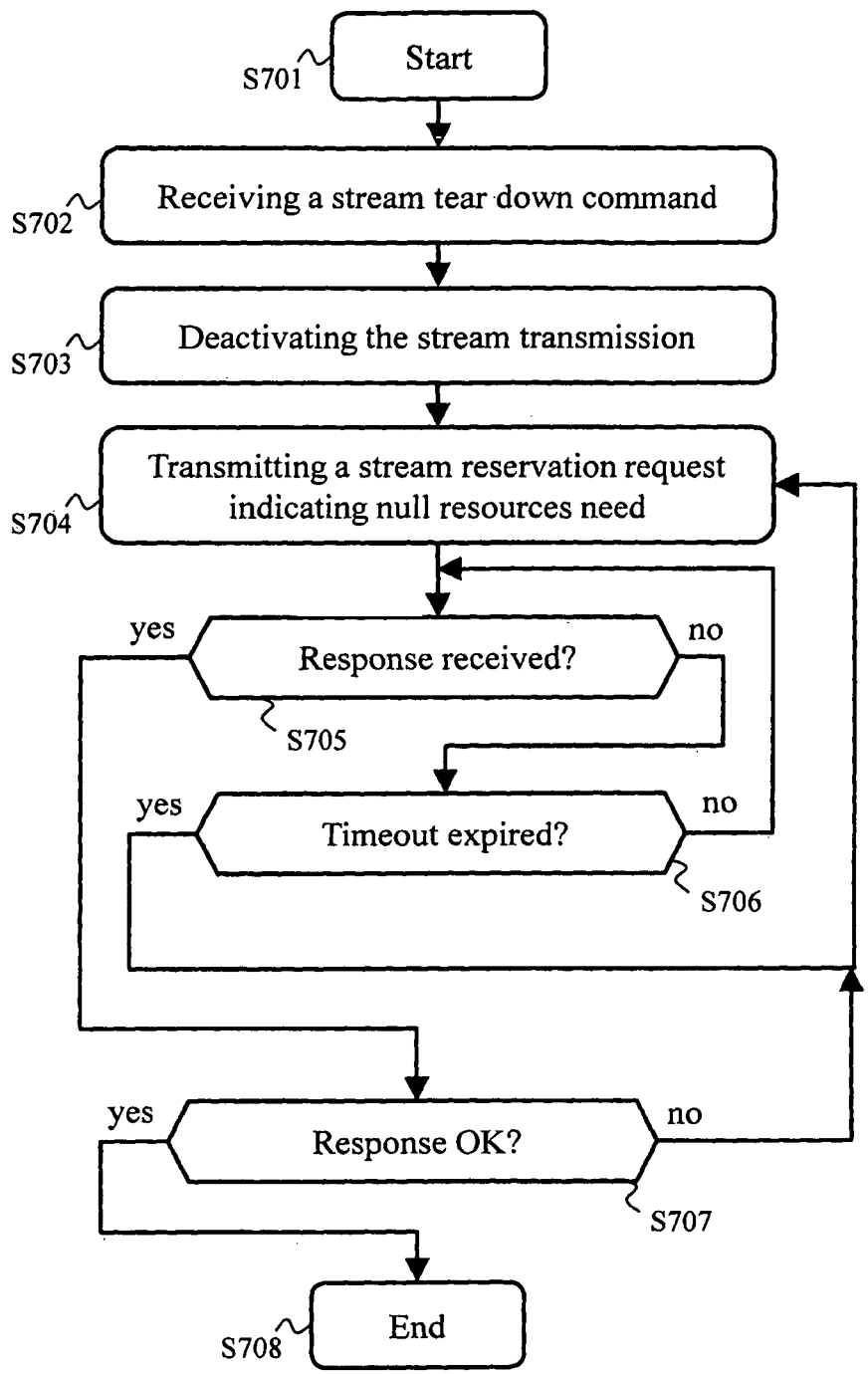

The characteristics of the invention will emerge more clearly from a reading of the following description of an example of embodiment, said description being produced with reference to the accompanying drawings, among which:

FIG. 1A schematically represents a mesh communications network in which the present invention may be implemented;

FIG. 1B schematically represents a forwarding table implemented by a node device of the mesh communications network;

FIG. 2 schematically represents an architecture of such node device and/or of a talker device of the mesh communications network and/or of a listener device of the mesh communications network;

FIG. 3 schematically represents an algorithm, performed by each node device, for processing a stream reservation request;

FIG. 4 schematically represents an algorithm, performed by the listener device, for processing the stream reservation request;

FIG. 5 schematically represents an algorithm, performed by each node device, for processing a stream reservation response;

FIG. 6 schematically represents an algorithm, performed by the talker device, for processing a stream setup command;

FIG. 7 schematically represents an algorithm, performed by the talker device, for processing a stream tear down command.

FIG. 1A schematically represents a mesh communications network in which the present invention may be implemented. The mesh communications network, is preferably of Ethernet type.

The mesh communications network shown in FIG. 1A comprises a talker device 101, a listener device 102 and a set of node devices 111, 112, 113, 114, 115.

The talker device 101 is adapted to provide, e.g. generate, data stream packets intended to be received and processed by the listener device 102. The node devices 111, 112, 113, 114, 115 are adapted to ensure that the data stream packets be transmitted from the talker device 101 to the listener device 102, according to resources allocation performed beforehand in the mesh communications network. The resources allocation process is detailed hereafter with regard to FIGS. 3, 4 and 5. The data stream setup process is detailed hereafter with regard to FIG. 6 and the data stream tear down process is detailed hereafter with regard to FIG. 7.

In order to enable setting up communications in the mesh communications network, the node devices implement a link-state routing protocol, which leads to each node device building a forwarding table. According to link-state routing protocol principles, every node device constructs a map of the connectivity to the mesh communications network, in the form of a graph, showing which node devices are connected to which other node devices. Each node device then independently computes the best data paths from each node device to every possible destination node device in the mesh communications network. The node device then stores a collection of best data paths in one or more aforementioned forwarding table. In other words, the link-state routing protocol leads to the node devices building from scratch the forwarding tables.

In a preferred embodiment, the node devices of the mesh communications network implement the link-state routing protocol SPB.

The talker device 101 and the listener device 102 may be node devices of the mesh communications network. The talker device 101 and the listener device 102 may be terminal devices of the mesh communications network, which means that the talker device 101 and the listener device 102 do not implement forwarding tables.

As the communications network is a mesh communications network, plural data paths typically exist between the talker device 101 and the listener device 102. One or more data paths may therefore be used to transmit a given data stream from the talker device 101 to the listener device 102. The talker device 101 may therefore be adapted to transmit said given data stream via a single data path, or via plural data paths by spreading said given data stream among said plural data paths according to a predefined spreading rule. The talker device 101 may also transmit said given data stream via a single data path at any instant, but switch in between data paths for effectively transmitting the data stream. Such a switch for instance occurs according to load balancing rules in the mesh communications network.

FIG. 1B schematically represents the forwarding table implemented by each node device 111, 112, 113, 114, 115. The forwarding table comprises information representative of data paths throughout the mesh communications network. Each row of the forwarding table represents a data path.

The forwarding table shown in FIG. 1B comprises a first column 151 storing, for each row, an address of a first end-point EP1 of the data path. The forwarding table further comprises a second column 152 identifying, for each row, via which port of the node device the first end-point EP1 is reachable throughout the data path. The forwarding table further comprises a third column 153 storing, for each row, an identifier of the concerned data path.

The forwarding table further comprises a fourth column 154 storing an indication of available resources associated with the output port specified in the second column 152.

The first 151, second 152 and third 153 columns of the forwarding table are filled with values resulting from the network discovery phase of the link-state routing protocol. Once the link-state routing protocol has ended, the fourth column 154 of the forwarding table is set with a predefined maximum value of resources associated with the output port specified in the second column 152. In other words, after building the forwarding table, the concerned node device enhances the forwarding table with an indication of available resources associated with the output port identified in the second column 152.

The resources associated with the output port may be available throughput of the link connected to said output port in the direction going from said node device to the corresponding neighbour node device. Neighbour node devices are node devices interconnected by a link. The resources associated with the output port may be buffer depth, latency or other QoS parameters. When said resources are concerning latency, it may refer to separate internal processing paths, and therefore separate internal resources, in the node devices. It may also refer to different priority levels managed by a data transmission scheduler using said priority levels to decide which pending message or data packet has to be transmitted first. It may also refer to an ability of a transmission traffic shaper to accept new data streams. It may also refer to a data loss probability.

In the context of a node device implementing such a forwarding table, said forwarding table is said local.

When a message or a data stream packet is received by a node device, said node device obtains, from said received message or data stream packet, a data path identifier, as well as an identifier of the addressee of said message or data stream packet. The node device further obtains an indication of the input port of said node device from which the message or the data stream packet has been received. Then, the node device parses the forwarding table to find out a row for which the third column 153 contains the obtained data path identifier and the first column 151 contains the addressee identifier. When the node device finds such a row and when the port indicated in the second column 152 of said row is different from the input port, the node device uses the port indicated in the second column 152 of said row as output port to forward the message. When the node device finds such a row and when the port indicated in the second column 152 of said row is identical to the input port, the node device uses all other ports as output ports to forward the received message or data stream packet. When the node device does not find such a row, the node device discards the received message or data stream packet.

FIG. 2 schematically represents an architecture of the node devices and/or of the talker device and/or of the listener device. Generally speaking, the architecture refers to a node device.

According to the shown architecture, the node device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard Disk Drive) 203, or any other device adapted to read information stored on storage means; and, a set 204 of communication interfaces, which allows communicating with neighbour node devices via respective links.

CPU 200 is capable of executing instructions loaded into RAM 201 from ROM 202, from an external memory such as an SD (Secure Digital) card, or from HDD 203. After the node device has been powered on, CPU 200 is capable of reading instructions from RAM 201 and executing these instructions. The instructions form one computer program that causes CPU 200 to perform some or all of the steps of at least one of the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm, performed by each node device of the mesh communications network, when processing a stream reservation request. Let's consider that the algorithm is executed by the node device 112.

When the node device 112 starts executing the algorithm of FIG. 3, each local forwarding table has been filled in, in accordance with the outcome of the link-state routing protocol.

In a step S301, the node device 112 receives a stream reservation request. The stream reservation request is either received from another node device or received from the talker device 101, according to the position of the node device 112 on the data path via which the data stream is expected to be transmitted. The stream reservation request is originally generated and transmitted by the talker device 101, as detailed hereafter with regard to FIGS. 6 and 7. The stream reservation request is a message including an REQ/ACK flag set to REQ (Boolean value "1").

In a following step S302, the node device 112 checks whether the received stream reservation request includes an RSV flag set to OK (Boolean value "1"). When the received stream reservation request includes an RSV flag set to OK, a step S304 is performed; otherwise, when the received stream reservation request includes an RSV flag set to KO (Boolean value "0"), a step S303 is performed.

In the step S303, the node device 112 propagates the stream reservation request as is. The stream reservation request comprises a destination identifier that identifies the listener device 102 as destination, as well as an identifier of a data path via which the stream reservation request has to be propagated. The destination identifier and the data path identifier allow the node device 112 to retrieve, from the local forwarding table(s), via which output port of the node device 112 the stream reservation request has to be propagated. Considering the forwarding table shown in FIG. 1B, said output port is indicated in the second column 152 of the row for which the first column contains the identifier of the listener 102 and for which the third column 153 contains the identifier of the data path via which the stream reservation request has to be propagated. It has to be noted that the step S303 is performed when an upstream node device has rejected the stream reservation request. Once the step S303 is performed, the algorithm ends.

In the step S304, the node device 112 checks whether the stream reservation request includes a valid sequence number. A valid sequence number is a sequence number greater than any sequence number present in previously received requests for the same data stream. When the sequence number included in the received stream reservation request is valid, a step S305 is performed; otherwise, which means that the stream reservation request has been received out of sequence, a step S306 is performed.

In the step S306, the node device 112 modifies the stream reservation request by setting the RSV flag to KO. Then, in a following step S307, the node device 112 propagates the stream reservation request via the data path indicated in the stream reservation request, using the destination identifier and the data path identifier included in the stream reservation request. Once the step S307 is performed, the algorithm ends.

In the step S305, the node device 112 checks whether the received stream reservation request includes an indication of a null resources need. When the received stream reservation request includes an indication of a null resources need, which means that the request concerns a stream tear down, a step S308 is performed; otherwise, a step S310 is performed.

In the step S308, the node device 112 frees the resources associated with the output port of the node device 112 via which the data stream is propagated and that were previously reserved or allocated to said data stream, if any. Then, in a following step S309, the node device 112 propagates the stream reservation request via the data path indicated in the stream reservation request, using the destination identifier and the data path identifier included in the stream reservation request. Once the step S309 is performed, the algorithm ends.

In the step S310, the node device 112 checks whether enough available resources, associated with the output port of the node device 112 via which the data stream is propagated (already set up data stream for which there is a change in the resources need) or expected to be propagated (data stream to be set up), exist to fulfill the requirements of resources indicated in the received stream reservation request. If enough resources exist, a step S311 is performed; otherwise, the step S306 is performed.

Preferably, each stream reservation request received by the node device 112 for a given data stream cancels any preceding stream reservation request for the same data stream and for the same data path.

In the step S311, the node device 112 optionally modifies the stream reservation request if needed. Indeed, the stream reservation request may contain, in addition to the indication of resources need for the data stream, an indication of a resources limit beyond which the data stream has not to be accepted. Such a resource limit can be a minimum bound under which there is no ability to transmit the data stream from the talker device 101 to the listener device 102. Such a resource limit can be a maximum bound above which there is no ability to transmit the data stream from the talker device 101 to the listener device 102. It depends on the type of the considered resources. The difference between the indication of the resources need and the indication of the resources limit represents some kind of negotiation margin for the node devices. When the node device 112 is not able to fulfill the requirements represented by the indication of resources need, and that a resources limit is also specified in the stream reservation request, the node device 112 may decide to accept the data stream setup, but with a more restricted reservation of resources, which is between the indication of resources need and the indication of resources limit. In this case, the node device 112 modifies the indication of resources need to represent the resource reservation ability of the node device 112 for said data stream.

In a following step S312, the node device 112 temporarily reserves for the data stream the resources, associated with the output port of the node device 112 via which the data stream is propagated (already set up data stream for which there is a change in the resources need) or expected to be propagated (data stream to be set up), as indicated in the stream reservation request. The resources reservation is temporary in that the resources are not yet effectively allocated to the data stream, and further confirmation is necessary in order to validate the resources reservation so that said resources be effectively allocated to the data stream.

In a preferred embodiment, the node device 112 starts a timer in the step S311 with a predefined timeout period. When the timer times out without the node device 112 having received an acknowledgement to said stream reservation request, the node device 112 cancels the temporary reservation made for said data stream.

Then, in a following step S313, the node device 112 propagates the stream reservation request via the data path indicated in the stream reservation request, using the destination identifier and the data path identifier included in the stream reservation request. Once the step S313 is performed, the algorithm ends.

FIG. 4 schematically represents an algorithm, performed by the listener device 102, for processing the stream reservation request.

In a step S401, the listener device 102 receives a stream reservation request. The stream reservation request is originally generated and transmitted by the talker device 101, as detailed hereafter with regard to FIGS. 6 and 7, and has been processed by on-path node devices, as already detailed with regard to FIG. 3.

In a following step S402, the listener device 102 checks whether the received stream reservation request includes an RSV flag set to OK (Boolean value "1"). When the received stream reservation request includes an RSV flag set to OK, a step S404 is performed; otherwise, when the received stream reservation request includes an RSV flag set to KO (Boolean value "0"), a step S403 is performed.

In the step S403, the listener device 102 generates a stream reservation response to the stream reservation request. The generated stream reservation response has the same contents as the received stream reservation request, except that the REQ/ACK flag is set to ACK (Boolean value "0") instead of REQ, and the stream reservation response comprises a destination identifier that identifies the talker device 102 as destination. The stream reservation response includes an identifier of the data path via which the stream reservation response has to be propagated, which is the reverse path compared to the data path followed by the received stream reservation request. When the forwarding tables are built according to the SPB protocol, the same path identifier as in the stream reservation request is used in the stream reservation response, as paths according to SPB are bidirectional. Then, the listener device 102 transmits the generated stream reservation response toward the talker device 101. Once the step S403 is performed, the algorithm ends.

A stream reservation response including the RSV flag set to KO is considered as a negative acknowledgement of the corresponding stream reservation request, and a stream reservation response including the RSV flag set to OK is considered as a positive acknowledgement of the corresponding stream reservation request.

In the step S404, the listener device 102 checks whether the stream reservation request includes a valid sequence number. A valid sequence number is a sequence number greater than any sequence number present in previously received requests for the same data stream. When the sequence number included in the received stream reservation request is valid, a step S405 is performed; otherwise, which means that the stream reservation request has been received out of sequence, a step S406 is performed.

In the step S406, the listener device 112 modifies the stream reservation request by setting the RSV flag to KO. Then, in a step S407, the listener device 102 generates the stream reservation response to the stream reservation request. The stream reservation response includes an identifier of the data path via which the stream reservation response has to be propagated, which is the reverse path compared to the data path followed by the received stream reservation request. Then, the listener device 102 transmits the generated stream reservation response toward the talker device 101. Once the step S407 is performed, the algorithm ends.

In the step S405, the listener device 102 checks whether the received stream reservation request includes an indication of a null resources need. When the received stream reservation request includes an indication of a null resources need, which means that the request concerns a stream tear down, a step S408 is performed; otherwise, a step S410 is performed.

In the step S408, the listener device 102 frees the resources, internal to the listener device 102, that were allocated to the data stream, if any. Then, in a following step S409, the listener device 102 generates the stream reservation response to the stream reservation request. The stream reservation response includes an identifier of the data path via which the stream reservation response has to be propagated, which is the reverse path compared to the data path followed by the received stream reservation request. Then, the listener device 102 transmits the generated stream reservation response toward the talker device 101. Once the step S409 is performed, the algorithm ends.

In the step S410, the listener device 102 checks whether enough available resources, internal to the listener device 102, exist to fulfill the requirements of resources need indicated in the received stream reservation request. If enough resources exist, a step S411 is performed; otherwise, the step S406 is performed.

In the step S411, the listener device 102 optionally modifies the stream reservation request if needed. Indeed, the stream reservation request may contain, in addition to the indication of resources need for the data stream, an indication of a resources limit beyond which the data stream has not to be accepted. As for the node devices in the algorithm of FIG. 3, the listener device 102 may have to modify the indication of resource need that was included in the stream reservation request, due to limitation of its internal resources.

In a following step S412, the listener device 102 allocates internal resources for processing the data stream concerned by the received stream reservation request. Then, in a following step S413, the listener device 102 generates the stream reservation response to the stream reservation request. The stream reservation response includes an identifier of the data path via which the stream reservation response has to be propagated, which is the reverse path compared to the data path followed by the received stream reservation request. Then, the listener device 102 transmits the generated stream reservation response toward the talker device 101. Once the step S413 is performed, the algorithm ends.

FIG. 5 schematically represents an algorithm, performed by each node device, for processing the stream reservation response. Let's consider that the algorithm is executed by the node device 112.

In a step S501, the node device 112 receives a stream reservation response. The stream reservation response is either received from another node device or received from the listener device 102, according to the position of the node device 112 on the data path via which the data stream is expected to be transmitted. The stream reservation response is originally generated and transmitted by the listener device 102, as already detailed with regard to FIG. 4. The stream reservation response is a message including an REQ/ACK flag set to ACK (Boolean value "0").

In a following step S502, the node device 112 checks whether the RSV flag of the received stream reservation response is set to OK (Boolean value "1"). When the RSV flag is set to OK, a step S505 is performed; otherwise, when the RSV flag is set to KO (Boolean value "0"), a step S503 is performed.

In the step S503, the node device 112 frees the resources that were reserved for the data stream in the step S312, if any. Then, in a step S504, the node device 112 propagates the stream reservation response as is. The stream reservation response comprises a destination identifier that identifies the talker device 101 as destination, as well as an identifier of the data path via which the stream reservation response has to be propagated. Once the step S504 is performed, the algorithm ends.

In the step S505, the node device 112 checks whether the stream reservation request includes a valid sequence number. When the sequence number included in the received stream reservation request is valid, a step S508 is performed; otherwise, which means that the stream reservation response, or the stream reservation request to which the stream reservation response refers, has been received out of sequence, a step S506 is performed.

In the step S506, the node device 112 modifies the stream reservation response by setting the RSV flag to KO. Then, in a following step S507, the node device 112 propagates the stream reservation response via the data path indicated in the stream reservation response, using the destination identifier and the data path identifier included in the stream reservation response. Once the step S507 is performed, the algorithm ends.

In the step S508, the node device 112 checks whether the received stream reservation request includes an indication of a null resources need. When the received stream reservation request includes an indication of a null resources need, which means that the request concerns a stream tear down, a step S509 is performed; otherwise, a step S510 is performed.

In the step S509, the node device 112 propagates the stream reservation request via the data path indicated in the stream reservation request, using the destination identifier and the data path identifier included in the stream reservation request. Once the step S509 is performed, the algorithm ends. In a variant, instead of freeing the resources in the step S308, the node device 112 frees said resources in the step S509, i.e. the node device 112 effectively frees said resources when receiving a positive acknowledgement from the listener device 102 instead of freeing the resources when receiving the corresponding request from the talker device 101.

In the step S510, the node device 112 effectively allocates the resources that were previously reserved for said data stream in the step S312. Then, in a following step S511, the node device 112 propagates the stream reservation request via the data path indicated in the stream reservation request, using the destination identifier and the data path identifier included in the stream reservation request. Once the step S511 is performed, the algorithm ends. The node device 112 may effectively allocate only a part of the resources that were temporarily reserved for the data stream in the step S312. Indeed, the stream reservation request and the corresponding stream reservation response may contain, in addition to the indication of resources need for the data stream, an indication of a resources limit beyond which the data stream has not to be accepted. In this case, the node device 112 may have reserved too much resources in the in the step S312, in view of the capability of node devices located downstream the node device 112 and/or in view of the capability of the listener device 102.

FIG. 6 schematically represents an algorithm, performed by the talker device 101, for processing a stream setup command.

In a step S601, the talker device 101 receives, or obtains, a stream setup command. In other words, the talker device 101 is instructed to setup a new data stream transmission from said talker device 101 to the listener device 102, or to adjust the resources allocated to an already existing data stream from said talker device 101 to the listener device 102. For instance, such a stream setup command results from a decision to switch the data stream from a first data path to a second data path. In this case, the talker device 101 requests via the mesh communications network that the necessary resources be allocated for the second data path by performing the algorithm of FIG. 6, and then requests via the mesh communications network that the resources previously allocated for the first data path be freed by performing the algorithm of FIG. 7.

In one embodiment, the talker device 101 checks whether the internal resources of said talker device 101 allow fulfilling the resources requirements of the stream setup command and whether enough available resources, associated with the output port of the talker device 101 via which the data stream is propagated (already set up data stream for which there is a change in the resources need) or expected to be propagated (data stream to be set up), exist to fulfill the resources requirements of the stream setup command. When not enough resources exist to fulfill the requirements of the stream setup command, the talker device 101 rejects the stream setup command; otherwise, the talker device 101 allocates the resources for said data stream according to said stream setup command. In a variant, the talker device 101 only temporarily reserves said resources and waits for receiving a positive acknowledgement from the listener device 102 to confirm the resources reservation and effectively allocate said resources to said data stream.

In a following step S602, the talker device 101 transmits a stream reservation request, corresponding to the stream setup command received in the step S601, via the data path via which the data stream is already set up or expected to be set up. When transmitting the stream reservation request, the talker device 101 starts a timer with a predefined timeout period.

In a following step S603, the talker device 101 checks whether a stream reservation response has been received in response to the stream reservation request. When such a stream reservation response has been received by the talker device 101, a step S606 is performed; otherwise, a step S604 is performed.

In the step S604, the talker device 101 checks whether the timer started in the step S602 timed out. When the timer timed out, a step S605 is performed; otherwise, the step S603 is repeated.

In the step S605, the talker device 101 transmits a stream reservation request indicating a null resources need for said data stream. In other words, the talker device 101 requests devices among the node devices on the data path of the data stream and the listener device 102, to free resources that were temporarily reserved or allocated due to the processing of the stream reservation request transmitted in the step S602. One should refer to the algorithm of FIG. 4 for details about how a stream reservation request indicating a null resources need is processed by the node devices. Once the step S605 is performed, the algorithm ends.

In the step S606, the talker device 101 checks whether the received response is positive, i.e. the talker device 101 checks whether the RSV flag included in the received response is set to OK (positive response) or KO (negative response). When the received response is positive, a step S607 is performed; otherwise, the step S605 is performed.

In the step S607, the talker device 101 effectively allocates the resources for the data stream, if not already performed in the step S601. Then, the talker device 101 activates the transmission of the data stream via the data path that was indicated in the stream reservation request transmitted in the step S602.

FIG. 7 schematically represents an algorithm, performed by the talker device 101, for processing a stream tear down command.

The algorithm of FIG. 7 starts in a step S701. In a following step S702, the talker device 101 receives, or obtains, a stream tear down command. In other words, the talker device 101 is instructed to terminate a data stream transmission from said talker device 101 to the listener device 102, for instance in the context of switching the data stream from one data path to another data path.

In a following step S703, the talker device 101 deactivates the transmission of the data stream via the concerned data path.

In a following step S704, the talker device 101 transmits a stream reservation request indicating a null resources need for said data stream. In other words, the talker device 101 requests devices among the node devices on the data path of the data stream and the listener device 102, to free resources that were allocated to said data stream. When transmitting the stream reservation request, the talker device 101 starts a timer with a predefined timeout period.

In a following step S705, the talker device 101 checks whether a stream reservation response has been received in response to the stream reservation request. When such a stream reservation response has been received by the talker device 101, a step S707 is performed; otherwise, a step S706 is performed.

In the step S706, the talker device 101 checks whether the timer started in the step S704 timed out. When the timer timed out, the step S704 is repeated; otherwise, the step S705 is repeated. The talker device 101 preferably performs at most N attempts to transmit the stream reservation request in successive occurrences of the step S704 for terminating said data stream, N being a predefined non-null positive integer.

In the step S707, the talker device 101 checks whether the received response is positive, i.e. the talker device 101 checks whether the RSV flag included in the received response is set to OK (positive response) or KO (negative response). When the received response is positive, the algorithm ends in a step S708; otherwise, the step S704 is repeated.

It has to be noted that, each time the talker device 101 transmits a stream reservation request for a given data stream, the talker device 101 increments, preferably by one unit, the sequence number included in said stream reservation request.

Moreover, each stream reservation request as transmitted by the talker device 101 includes the RSV flag, by default set to OK, as well as the REQ/ACK flag, by default set to REQ. Each stream reservation request as transmitted by the talker device 101 further includes a data stream identifier identifying the data stream to which the stream reservation request applies, and a talker identifier identifying the talker device 101 as the originator of the stream reservation request and therefore identifying the device toward which the resulting stream reservation response has to be propagated.

Each stream reservation request as transmitted by the talker device 101 further includes a listener identifier identifying the listener device 102 as the addressee of the stream reservation request, and a data path identifier identifying the data path via which the stream reservation request has to be propagated.

Each stream reservation request as transmitted by the talker device 101 further includes an indication of a resources need for the transmission of the data stream. When said indication is null, it means that the stream reservation request is used to tear down the concerned data stream.

Each stream reservation request as transmitted by the talker device 101 may further include other parameters, such as maximum and minimum resources bounds.

In one embodiment, the listener device 102 is in charge of selecting the appropriate data path(s) among plural data paths that were proposed by the talker device 101 for transporting the data stream. In this case, the talker device transmits plural stream reservation requests via respective distinct data paths. The listener device 102 then receives said plural stream reservation requests. As already mentioned, the stream reservation request may contain, in addition to the indication of resources need for the data stream, an indication of a resources limit beyond which the data stream has not to be accepted. Node devices on the data paths may therefore have modified the resources need indications in the respective stream reservation requests. The listener device 102 therefore selects the data path(s) showing the best performances, according to the resources need indications in the respective stream reservation requests. The listener device 102 may select only one data path. Selecting more than one data path would enable the talker device 101 to perform load balancing by using plural data paths for the data stream. Selecting more than one data path would enable the talker device 101 to make the final decision of which data path(s) would be used for the data stream. Then, the listener device 102 transmits toward the talker device 101 a positive stream reservation response to each stream reservation request corresponding to the selected data path, or to one of the selected data paths, and a negative stream reservation response to each stream reservation request corresponding to another data path. Either the talker device 101 transmits a predefined number, known by the listener device 102, of stream reservation requests for respective distinct data paths, or the listener device 102 implements a timer having a predefined timeout and starts the timer when receiving the first stream reservation requests in sequence for said data stream. Then, when the timer times out, the listener device 102 considers that all stream reservation requests for said data stream have been received.

The invention claimed is:

1. A method for allocating resources in a mesh communications network for setting up a data stream transmission from a talker device to a listener device via at least one node device, data paths being defined throughout the mesh communications network following a link-state routing protocol, wherein each node device performs:
receiving a stream reservation request for said data stream transmission, said reservation request indicating resources requirements for said data stream and an indication of a resources limit, said resources limit represents at least one of a minimum level or a maximum level to be satisfied by an effective capability of said node device in order to accept said data stream;
obtaining, from said stream reservation request, a path identifier identifying a data path via which said data stream transmission has to be set up, and an identifier of said listener device;
determining via which output port of said node device the data path identified in the stream reservation request continues toward the listener device;
checking whether there are enough resources, associated with the determined output port, to fulfil said resources requirements of and said resources limit indicated by the received stream reservation request;
when there are enough said resources:
temporarily reserving resources for said data stream transmission;
propagating the stream reservation request toward the listener device; and
when receiving for said data stream transmission a stream reservation response representative of a positive acknowledgement to said stream reservation request:
effectively allocating at least part of the reserved resources; and
propagating the stream reservation response toward the talker device; and
when said effective capability of said node device for said data stream is between said resources requirements and said resources limit such that said data stream:
modifying said indication of resources requirements in said stream reservation request to show said effective capability of said node device for said data stream; and
when receiving said stream reservation response representative of a positive acknowledgement to said stream reservation request, effectively allocating only the amount of resources represented by said indication of resources requirements included in said stream reservation response,
wherein, when there is not enough said resources, said node device performs:
modifying the stream reservation request by indicating a resource reservation problem; and
propagating the modified stream reservation request.

2. The method according to claim 1, wherein the listener device performs:
receiving the stream reservation request;
checking whether there are enough internal resources to fulfil resources requirements of the received stream reservation request;
transmitting toward the talker device the stream reservation response representative of a positive acknowledgement to said stream reservation request, when there are enough said internal resources; and
transmitting toward the talker device a stream reservation response representative of a negative acknowledgement to said stream reservation request, when there is not enough said internal resources.

3. The method according to claim 1, wherein, when receiving the stream reservation request, the listener device performs beforehand:
checking whether the received stream reservation request indicates a resource reservation problem that occurred upstream; and
transmitting toward the talker device a stream reservation response representative of a negative acknowledgement to said stream reservation request, when the stream reservation request indicates the resource reservation problem.

4. The method according to claim 1, wherein, when transmitting a stream reservation request, the talker device starts a first timer with a first predefined timeout, and when the first timer times out without the talker device having received the stream reservation response representative of a positive acknowledgement to said stream reservation request, the talker device instructs said node device to free said reserved resources.

5. The method according to claim 1, wherein, when receiving for said data stream transmission a stream reservation response representative of a negative acknowledgement to said stream reservation request, said node device performs:
freeing said reserved resources; and
propagating toward the talker device said stream reservation response.

6. The method according to claim 1, wherein said node device frees reserved or allocated resources for said data stream, when receiving a stream reservation request with a null indication of resources needed.

7. The method according to claim 1, wherein, when temporarily reserving resources for said data stream, said node device starts a second timer with a second predefined timeout, and when the second timer times out without said node device having received the stream reservation response representative of a positive acknowledgement to said stream reservation request, said node device frees said reserved resources.

8. The method according to claim 1, wherein the talker device transmits plural stream reservation requests for said data stream via plural respective distinct data paths,
and wherein, when the listener device receives said plural stream reservation requests, the listener device performs:
selecting at least one data path for which the stream reservation request shows the best performances among said plural stream reservation requests, according to the indications of resources requirements included in the respective stream reservation requests;
transmitting a stream reservation response representative of a positive acknowledgement to the stream reservation request(s) concerning the selected data path(s); and transmitting a stream reservation response representative of a negative acknowledgement to each stream reservation request concerning another data path than the selected data path(s).

9. The method according to claim 1, wherein, said data paths resulting from the link-state protocol are described in forwarding tables each consisting of a correspondence between:
- a data path identifier;
- an identifier of an end-point of said data path; and
- an identifier of an output port of the node device implementing said forwarding table, via which the identified end-point of said data path is reachable;

and wherein, after building the forwarding table, the node device enhances said forwarding table with an indication of available resources associated with the identified output port.

10. The method according to claim 1, wherein the mesh communications network is of Ethernet type and wherein the link-state routing protocol is the Shortest Path Bridging SPB protocol.

11. A non-transitory computer-readable medium storing a program for causing a computer to execute the method according to claim 1, when the program is run by the computer.

12. A node device intended to be included in a mesh communications network for setting up a data stream transmission from a talker device to a listener device, data paths being defined throughout the mesh communications network following a link-state routing protocol, wherein said node device implements a processing circuitry:
- to receive a stream reservation request for said data stream transmission, said reservation request indicating resources requirements for said data stream and an indication of a resources limit, said resources limit represents at least one of a minimum level or a maximum level to be satisfied by an effective capability of said node device in order to accept said data stream;
- to obtain, from said stream reservation request, a path identifier identifying a data path via which said data stream transmission has to be set up, and an identifier of said listener device;
- to determine via which output port of said node device the data path identified in the stream reservation request continues toward the listener device;
- to check whether there are enough resources, associated with the determined output port, to fulfil said resources requirements and said resources limit indicated by the received stream reservation request;
- when there are enough said resources, said node device further implements a processing circuitry:
  - to temporarily reserve resources for said data stream transmission; and
  - to propagate the stream reservation request toward the listener device;
  - when receiving for said data stream transmission a stream reservation response representative of a positive acknowledgement to said stream reservation request, said node device further implements a processing circuitry:
    - to effectively allocate at least part of the reserved resources; and
    - to propagate the stream reservation response toward the talker device; and
- when said effective capability of said node device for said data stream is between said resources requirements and said resources limit such that said data stream:
  - to modify said indication of resources requirements in said stream reservation request to show said effective capability of said node device for said data stream; and
  - when receiving said stream reservation response representative of a positive acknowledgement to said stream reservation request, to effectively allocate only the amount of resources represented by said indication of resources requirements included in said stream reservation response,
- wherein, when there is not enough said resources, said node device implements a processing circuitry:
  - to modify the stream reservation request by indicating a resource reservation problem; and
  - to propagate the modified stream reservation request.

* * * * *